United States Patent
Bruening et al.

(10) Patent No.: US 6,524,482 B2
(45) Date of Patent: Feb. 25, 2003

(54) USE OF ION BINDING LIGANDS ATTACHED TO SOLID SUPPORTS AND MEMBRANES FOR ION REMOVAL FROM A BIOLOGICAL SYSTEM

(75) Inventors: Ronald L. Bruening, American Fork, UT (US); Krzysztof E. Krakowiak, American Fork, UT (US); Anthony J. DiLeo, Westford, MA (US); Tongbo Jiang, Bedford, MA (US)

(73) Assignees: IBC Advanced Technologies, Inc., American Fork, UT (US); Mykrolis Corporation, Bedford, MA (US)

( * ) Notice: Subject to any disclaimer, the term of this patent is extended or adjusted under 35 U.S.C. 154(b) by 0 days.

(21) Appl. No.: 09/838,664

(22) Filed: Apr. 19, 2001

(65) Prior Publication Data

US 2002/0153322 A1 Oct. 24, 2002

(51) Int. Cl.[7] .................................. B01D 61/00
(52) U.S. Cl. ................... 210/651; 210/650; 210/502.1; 210/198.2; 210/634; 435/299; 435/7.1
(58) Field of Search ............................... 210/651, 198.2, 210/500.23, 634, 502.1, 650; 435/299, 7.21; 422/44

(56) References Cited

U.S. PATENT DOCUMENTS

| | | | |
|---|---|---|---|
| 4,618,533 A | | 10/1986 | Steuck |
| 4,693,985 A | * | 9/1987 | Degen et al. |
| 4,943,375 A | | 7/1990 | Bradshaw et al. |
| 4,952,321 A | | 8/1990 | Bradshaw et al. |
| 4,959,153 A | | 9/1990 | Bradshaw et al. |
| 4,960,882 A | | 10/1990 | Bradshaw et al. |
| 5,039,419 A | | 8/1991 | Bradshaw et al. |
| 5,071,819 A | | 12/1991 | Tarbet et al. |
| 5,078,978 A | | 1/1992 | Tarbet et al. |
| 5,084,430 A | | 1/1992 | Tarbet et al. |
| 5,136,032 A | * | 8/1992 | Nagamatsu et al. |
| 5,173,470 A | | 12/1992 | Bruening et al. |
| 5,179,213 A | | 1/1993 | Bradshaw et al. |
| 5,182,251 A | | 1/1993 | Bruening et al. |
| 5,190,661 A | | 3/1993 | Bruening et al. |
| 5,244,856 A | | 9/1993 | Bruening et al. |
| 5,250,188 A | | 10/1993 | Bruening et al. |
| 5,268,287 A | * | 12/1993 | Matsuki et al. |
| 5,273,660 A | | 12/1993 | Bruening et al. |
| 5,286,449 A | * | 2/1994 | Kuroda et al. |
| 5,334,316 A | | 8/1994 | Bruening et al. |
| 5,393,892 A | | 2/1995 | Krakowiak et al. |
| 5,547,760 A | | 8/1996 | Tarbet et al. |
| 5,618,433 A | | 4/1997 | Tarbet et al. |
| 5,622,996 A | | 4/1997 | Fish |
| 5,646,001 A | * | 7/1997 | Terstappen et al. |
| 5,683,916 A | * | 11/1997 | Goffe et al. |
| 5,785,977 A | | 7/1998 | Breithbarth |
| 5,980,987 A | | 11/1999 | Tarbet et al. |

* cited by examiner

Primary Examiner—Ana Fortuna
(74) Attorney, Agent, or Firm—Thorpe North & Western

(57) ABSTRACT

The present invention provides methods for removing species of ions from biological solutions, thereby allowing controlled study of the biological effect of one or more ion on a biological system or environment. In general, a solution from which one or more ion species are to be removed is contacted with an ion binding ligand having an affinity for the desired ion wherein the ligand is bound to a substrate such as a solid support or membrane. After the ions have been bound by the ligand-substrate composition, the composition having the ions bound thereto is removed, leaving a solution with a reduced concentration of the one or more ions which were targeted. The biological solution may then be compared to a control biological solution in its original state, or ions may added back into the depleted biological solution at known concentrations. Under either scenario, the biological effects of one or more ions may be studied.

31 Claims, 2 Drawing Sheets

USE OF ION BINDING LIGANDS ATTACHED TO SOLID SUPPORTS AND MEMBRANES FOR ION REMOVAL FROM A BIOLOGICAL SYSTEM

BACKGROUND OF THE INVENTION

Ions such as calcium, magnesium and iron play a vital role in many important biological functions, including cell growth, enzymatic activity, regulatory function and signal transduction. Understanding how these ions control in vitro functions requires a corresponding control of the concentrations of the ions in physiological buffers or culture media.

The simplest way to control the concentration of a particular ion species is to remove it completely from the buffer or media, and then add it back to the desired concentration. In practice, however, this is very difficult as ions exist naturally everywhere. The difficulty of removing $Ca^{2+}$ from a solution, for instance, was first recognized by Sidney Ringer in 1883 when he was forced to retract a paper written the year before which stated that calcium was not required for a frog's heart to beat.

One way of removing such ions from solution is by dialysis, but this method is generally slow and cumbersome. Another method of removing such ions is by titration with EDTA. In fact, EDTA in particular is very widely used and forms complexes with most metal ions. However, EDTA is generally a non-specific chelating or complexing agent. Thus, EDTA will bind to the majority of the various divalent metal ions, and as a result, may remove ions other than those targeted. In addition, EDTA titration often requires an excess of the chelating or complexing agent for the complete removal of a targeted ion species from the solution. As such, the presence of these extra surplus chelating or complexing agents in the biological solution may have unanticipated or undesired biological side effects.

SUMMARY OF THE INVENTION

The present invention provides methods for removing species of ions from solutions used in biological applications, thereby allowing controlled study of the biological effect of one or more ions. The methods described herein are particularly effective for preferentially removing calcium ions from biological solutions that contain protein, which is surprising since proteins are known to bind calcium ions, thus, preventing their removal.

In general, a biological solution from which one or more ion species is to be removed is contacted with an ion binding ligand having an affinity for the desired ion wherein the ligand is bound to a substrate such as a particulate solid support or membrane. After the ions have been bound by the ligand-substrate composition, the composition having the ions bound to it (or the solution having a depleted ion content) is removed, leaving the biological solution with a reduced or depleted concentration of the targeted ion. The biological solution can then be compared to a control biological solution, or alternatively, ions can be added back into the depleted biological solution at known concentrations. Under either scenario, the biological function of one or more ions in a biological solution may be studied.

The ligand-substrate composition for use with the present method may be represented by Formula 1, as follows:

$$S\text{---}B\text{---}L \qquad \text{Formula 1}$$

wherein S is a substrate; L is any ion-binding ligand having an affinity for one or more ion species and having a functional group for attachment to S; and B is the covalent linkage mechanism which attaches S to L.

In a preferred embodiment, the composition for use with the present method will comprise one or more different ion binding ligand(s) (L) that is ion species specific. It is also preferred that the substrate (S) comprises a filtration-type media commonly used in the liquid purification arts, wherein the substrate, such as organic beads, membranes or composite membranes, and is derivatized to have a hydrophilic surface and polar functional groups, to which the ligand may be covalently bound. While the above mentioned substrate materials and forms are preferred other substrates may be used provided functionality is present.

The methods of the invention can be used to filter out ion species from biological solutions, particularly those which contain protein. Such ion species include, but are not limited to, $Ca^{2+}$ and $Mg^{2+}$ together over other ions, or in some circumstances, $Ca^{2+}$ may be preferentially removed over $Mg^{2+}$. These ions can be removed from solutions such as, but not limited to, serum; blood; biological buffers, e.g., Tris(hydroxymethyl)aminomethane; nucleic acid amplification buffers; tissue culture media, e.g., Dulbecco's Modified Eagle Medium (DMEM) (both serum free and serum supplemented); and MS (Murashige and Skoog) medium.

The invention may be carried out by preferably using a filtration or separation device containing the ion binding ligand bound to the substrate. A biological solution from which the ions are to be removed can be caused to flow through this device containing the ion binding ligand bound to the substrate, so that the ions are trapped by the ligand, and the biological solution that is recovered is essentially free of the ion species. This step may be repeated with the same ligand bound substrate or with a different ligand bound substrate in order to increase the biological solution purity, i.e., further deplete the ion species from the biological solution.

If the ligand is bound to solid supports, such as acrylate or glass beads, the beads can be packed into a column through which the biological solution containing the ions would be passed. The ions would be bound by the ligand on the surface of the beads and remain in the column, allowing the biological solution, now with the ion concentration greatly reduced, to pass out of the column. Alternatively, the ion binding ligands can be bound to a filtration membrane through which is passed the biological solution containing the ions that are to be removed. As with the column, the ions will bind to the ligand attached to the membrane. Thus, the solution that is recovered should have a greatly reduced ion concentration.

DETAILED DESCRIPTION OF THE INVENTION

Figure 1:
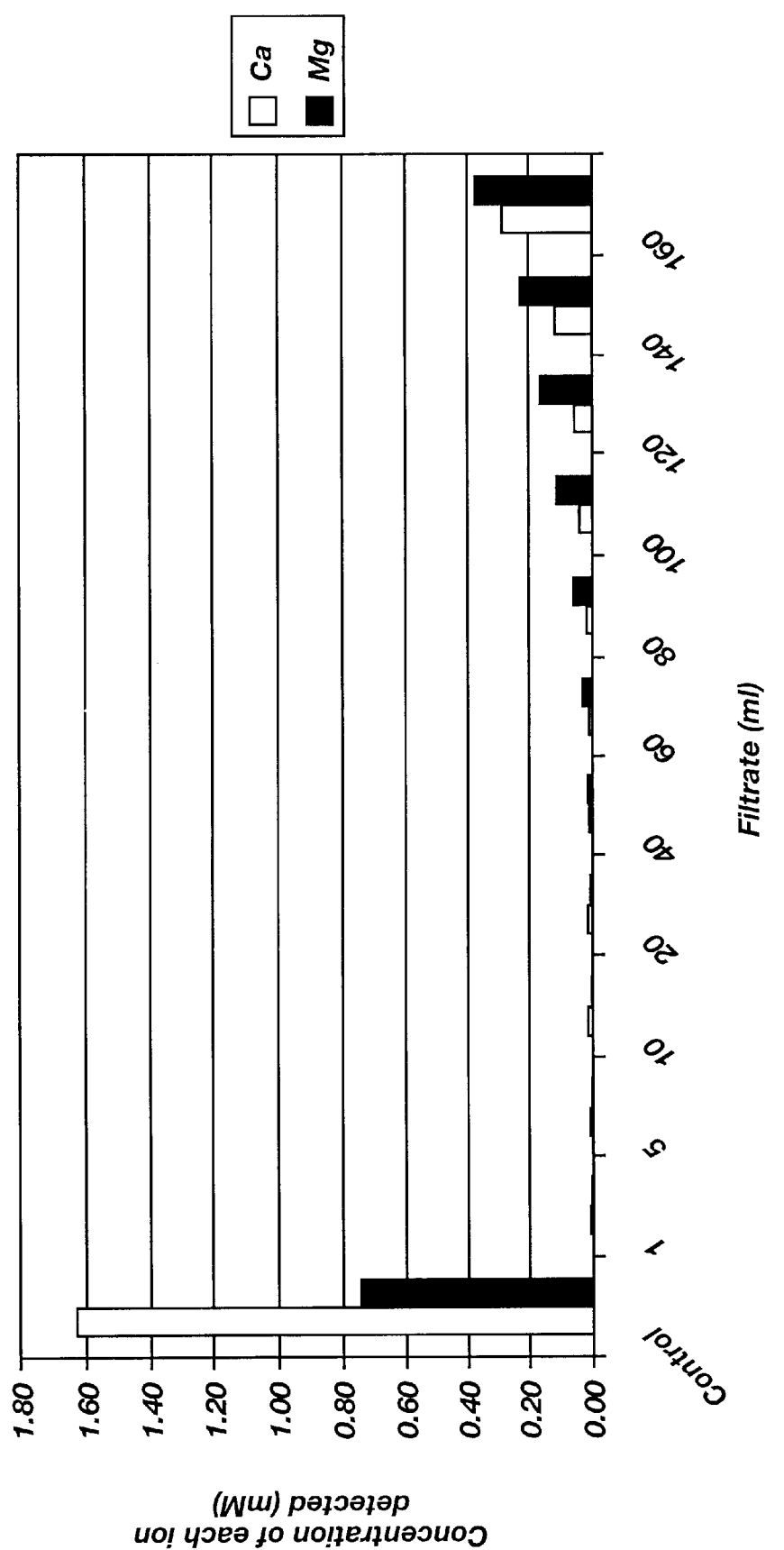
FIG. 1 is a graph showing the simultaneous removal of both $Ca^{2+}$ ions (open bars) and $Mg^{2+}$ ions (black bars) from 50 mM Tris-HCl buffer (pH 7.0) spiked with 1.8 mM $CaCl_2$ and 0.83 mM $MgCl_2$. The X-axis shows the amount of filtrate run through a column packed with 2 grams of acrylate beads bound with an alkalene polyamine acid containing ligand available from IBC Advanced Technologies, Inc. under the tradename SUPERLIG 430. The Y-axis shows the concentration of $Ca^{2+}$ and $Mg^{2+}$ ions in the filtrate as it is run through the column.
Figure 2:
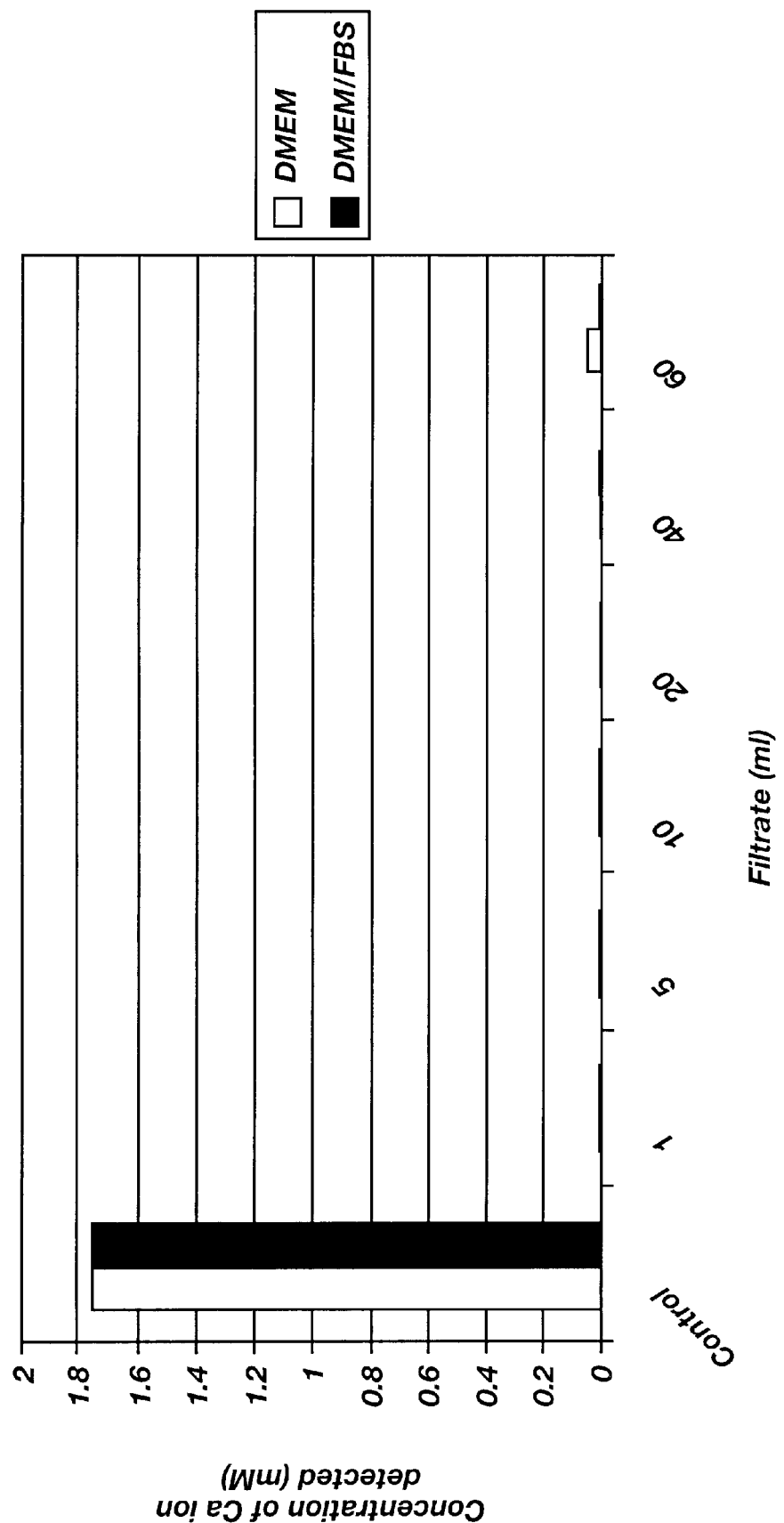
FIG. 2 is a graph showing removal of $Ca^{2+}$ ions from Dulbecco's Modified Eagle Medium (DMEM) spiked with $CaCl_2$ and $MgCl_2$, with (black bars) and without (open bars) 10% fetal bovine serum (FBS). The X-axis shows the amount of filtrate run through a column packed with 1 gram of ligand-bound beads. The Y-axis shows the concentration of $Ca^{2+}$ in the filtrate.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting.

It must be noted that, as used in this specification and the appended claims, the singular forms "a," "an," and "the" include plural referents unless the content clearly dictates otherwise.

"Ion species" or "target ion species" denotes a specific ion, e.g., $Ca^{2+}$, or a particular class of ions, e.g., $Ca^{2+}$, $Mg^{2+}$. These terms are also intended to denote a class of ion which may potentially be free, e.g., $Ca^{2+}$ from $CaCl_2$, or $Ca^{2+}$ from Ca-binding proteins in extracellular fluids and serum-supplemented tissue culture media.

"Biological solution" or "biological environment" shall mean any liquid necessary to perform a biological function from which it may be desirable to remove one or more ion species, such as, but not limited to, blood; serum; biological buffers, e.g., Tris(hydroxymethyl)aminomethane; nucleic acid amplification buffers; tissue culture or biological media, e.g., Dulbecco's Modified Eagle Medium (DMEM); and/or MS (Murashige and Skoog) medium. In the case of calcium ion separation, particularly preferred biological solutions include protein-containing solutions, as calcium ions are particularly difficult to preferentially remove from such solutions.

A "biological function" is any in vivo or in vitro activity that has a biological basis. Biological functions may include, but are not limited to, functions such as nerve firing, enzyme activity and stability, cell adhesion, electrical activity, chemotaxis, hormone release, or cell permeability. Such functions may occur within biological material, e.g., in vivo, or may also occur outside such material, e.g., in vitro, in biological extracts or isolates.

A "substrate" is a support to which the ligand is bound. Specifically, the substrate is preferably a hydrophilic membrane, partially hydrophilic membrane, composite membrane, porous organic solid support, nonporous organic solid support, porous inorganic solid support, nonporous inorganic solid supports and combinations thereof. If the substrate is a membrane, membranes such as those described in U.S. Pat. Nos. 5,618,433 and 5,547,760, both of which are herein incorporated by reference in their entirety, are exemplary. If the substrate is an inorganic or organic particulate solid support, preferred solid supports include sand, silicas, silicates, silica gel, glass, glass beads, glass fibers, alumina, zirconia, titania, nickel oxide polyacrylate, polystyrene, polyphenol and others as described in U.S. Pat. Nos. 4,943,375, 4,952,321, 4,959,153, 4,960,882, 5,039,419, 5,071,819, 5,078,978, 5,084,430, 5,173,470, 5,179,213, 5,182,251, 5,190,661, 5,244,856, 5,273,660 and 5,393,892 which are herein incorporated by reference. Specific examples include flexible membranes, beads or particulates, filters, or any other substrate known in the art that is useful for chemical separations.

An "ion binding ligand" is a moiety that (1) can bind the desired ion species, and (2) is covalently bonded to the substrate. In general, the chemistry of the substrate, or the chemistry of any coating applied to the substrate, will drive the choice of the functional group of the ligand for binding to the substrate. Representative substrates and the chemistry of covalently binding the ligand to the substrate is disclosed and taught in U.S. patent applications Ser. Nos. 09/202,731, 09/330,503, 09/330,477, 09/406,256; and U.S. Pat. Nos. 5,618,433, 5,980,987, 5,547,760, 4,943,375, 4,952,321, 4,959,153, 4,960,882, 5,039,419, 5,071,819, 5,078,978, 5,084,430, 5,173,470, 5,179,213, 5,182,251, 5,190,661, 5,244,856, 5,273,660, 5,334,316, 5,393,892 and 5,250,188 which are herein incorporated herein by reference. Additionally, two pending patent applications also filed on Apr. 19, 2001, the entire teachings of which are incorporated herein by reference (hereinafter referred to as Ser. Nos. 09/838,660 and 09/838,663, respectively), also disclose representative substrates and the chemistry of covalently binding ligands to the substrates. The compositions described in Ser. Nos. 09/838,660 and 09/838,663 are particularly preferred for preferentially removing $Ca^{2+}$ from $Mg^{2+}$.

To further illustrate, if the substrate (or its coating) displays a carboxylic acid functional group, an appropriate ligand might be one with a pendant amine group which can form an amide bond with the substrate. Depending on the ion binding ligands chosen, these ions can be removed either simultaneously or sequentially. To remove a single ion species from a solution, the substrate through which the solution is to be passed will comprise only a single ion binding ligand, i.e., one that specifically binds that ion. To remove more than a single ion species, the substrate should comprise those ligands specific for binding the ion species that are to be removed from the solution.

The present invention provides methods for removing metal ion species from biological solutions including, but not limited to, $Cr^{3+}$, $Ca^{2+}$, $Mg^{2+}$, $Na^+$, $K^+$, $Fe^{2+}$, and $Fe^{3+}$. Metal ions can have distinct biological effects and are typically present at unknown (and generally variable or low) concentrations in solutions. Hence, there is a real need for methods to efficiently remove and filter out these ions from biological solutions so that the biological solution may be compared to a control solution, or alternatively, so that the ions may be added back at known concentration. Thus, the effects of these ion species on biological processes can be evaluated. The present invention accomplishes this separation effectively and efficiently by the use of ligands bonded to substrates in accordance with the present invention. It has been found that the substrate-ligand composition used in the methods of the present invention are capable of rapidly and essentially completely removing ions from solutions, even in the presence of protein.

The methods of this invention can be used to remove ions from many biological solutions such as, but not limited to, physiological and biological buffers, e.g., Tris (hydroxymethyl)-aminomethane; blood; serum; buffers; nucleic acid amplification buffers; tissue culture media, e.g., Dulbecco's Modified Eagle Medium (DMEM); and/or MS (Murashige and Skoog) medium. In one embodiment, the tissue culture media can be later solidified. The methods can be used in a variety of applications including, but not limited to, quantitation and/or removal of ions from solutions for use in scientific research, e.g., in determining the effects of known ion concentrations on biological processes.

Ions having wide-ranging biological effects are particularly interesting to study by the methods of the present invention. For example, $Ca^{2+}$ is involved in nerve firing, enzyme activity and stability, cell adhesion, electrical activity, chemotaxis, hormone release, cell permeability, and other biological functions. Additionally, other ions, such as $Na^+$, $K^+$ and $Mg^{2+}$, also play roles as activators and cofactors of many enzymes, proteins, and biological molecules. Accurate study of the effect of these ions and others on proteinion interactions, enzyme inhibition or activation, cell growth, differentiation, or other biological functions where ions play an important role requires strict qualitative and quantitative control of the concentrations of these ions.

The methods of the invention also have industrial applications such as in bioreactors, where the release of valuable secondary metabolites by cells in culture may be sensitive to the concentrations of certain ions. The stability and activity of industrially important enzymes or biological materials also require strict control of the concentrations of certain ions. Citrate or EDTA are added to whole blood to inhibit blood clotting enzymes, for instance, while $Ca^{2+}$ is essential for the stability of α-amylase.

In general, a solution from which one or more ion species are to be removed is contacted with an ion binding ligand bound to a substrate, where the ligand has an affinity for the ion species. The substrate forms a support for the ligand and can be in the form of a membrane, beads or solid support particulates, or any other form commonly used in biochemical or chemical separations. If a membrane is used as the substrate, the ligand-substrate composition can be incorporated into a contacting device comprising a housing, e.g., cartridge, containing the composition of matter of the invention by causing solution containing desired ions to flow through the cartridge and thus come in contact with the composition of the invention. Preferably the membrane configuration is a pleated membrane, although other membrane configurations, such as flat sheet, stacked disk or hollow fibers may be used. However, various contact apparatus may be used instead of a cartridge such as but not limited to a cassette, syringe, unit, canister, multi-well plate or filter holder. If a solid support is used, separation columns can be used as are known in the art.

After the ions have been bound by the ligand-substrate composition, the composition having the ions bound thereto is removed, leaving a solution with a reduced concentration of the one or more ions which were targeted. The biological solution may then be compared to a control biological solution in its original state, or ions may added back into the depleted biological solution at known concentrations. Under either scenario, the biological effects of one or more ions may be studied.

The ligand-substrate composition used with the present methods is preferably represented by the formula:

wherein S is a substrate; L is any ion-binding ligand having an affinity for said one or more ion species and having a functional group for attachment to S; and B is the covalent linkage mechanism which attaches S to L. Representative of B linkages are members selected from the group consisting of amide (—NHC(O)—), ester (—C(O)O—), thioester (—C(O)S—), carbonyl (—C(O)—), ether (—O—), thioether (—S—), sulfonate (—S(O)$_2$O—) and sulfonamide (—SO$_2$NH—), though amide bonds are often preferred.

It is important to note that ion binding ligands bonded to substrates that fit within this general formula have a wide variety of structural configurations that are functional with the methods of the present invention. Some of the configurations are described and illustrated in the following U.S. patent applications and U.S. Pat. Nos. which include 09/838,660, 09/838,663, 09/202,731, 09/330,503, 09/330,477, 09/406,256, 5,618,433, 5,980,987, 5,547,760, 5,273,660, 4,952,321, 5,071,819, 5,084,430, 5,078,978, 5,244,856, 5,179,213, 4,943,375, 5,393,892 and 5,334,316, each of which are incorporated herein by reference. Each patent describes specific compositions that are functional with the methods of the present invention, depending on which ions are desired to be removed. Additionally, even EDTA bonded to various substrates may be used for some applications.

The invention is based upon the discovery that through the use of selective ligand bound substrates or combinations of ligand bound substrates, as described in the above referenced patents and pending applications as well as in other patents, the concentration of ions in biological solutions can be regulated by removing specific ions from solutions and then, optionally, adding them back to known concentrations. Surprisingly, it was further discovered that even though calcium ions typically bind to protein, ligands used herein are effective in removing calcium ions from protein containing biological solutions. The specific ligand or ligands to be utilized may vary according to the ions to be removed and also the composition of the solutions from which they are to be removed. Given the guidelines provided herein, the ligand or ligands to be used may be empirically determined for any given ion species and/or biological solution by one skilled in the art without the need to resort to undue experimentation.

To illustrate a specific example, for studying the effects of $Ca^{2+}$ ions on protoplasmic streaming in *Paramecium* or *Amoeba*, the appropriate microbiological media for these organisms would be passed through a column packed with beads coated with a ligand that preferentially binds $Ca^{2+}$, thereby removing that ion from the media. The $Ca^{2+}$-depleted media is then aliquotted, and varying amounts of $Ca^{2+}$ are added to the aliquots. The behavior of the organisms in relation to varying $Ca^{2+}$ concentrations can then be evaluated accurately. Exemplary compositions for use with this method and others where $Ca^{2+}$ is the desired ion to study include those described in copending applications (09/838,660 and 09/838,663) referenced above.

This type of study is significant because $Ca^{2+}$ is required for stability and/or activity of many enzymes, including collagenase, a-amylase, NAD-kinase, protein kinase, degradative enzymes such as proteases, and blood clotting enzymes (e.g., Factors II, VII, IX and X). Control of the concentration of $Ca^{2+}$ is therefore important in controlling the activity of such enzymes. For example, chelating agents such as citrate are added to whole blood to inhibit the action of these enzymes. A commercial supplier of α-amylase would also need to strictly control the $Ca^{2+}$ concentration in order to stabilize the enzymes during storage in purified form.

$Ca^{2+}$ also causes binding of pectic acid to calcium pectate during cell wall formation in plants, and is thus responsible for their structural integrity. In some plants, increased concentrations of $Ca^{2+}$ can increase the utilization of the nutrient ammonia. Nerve cells are also sensitive to a reduction in the concentration of $Ca^{2+}$, and when the concentration becomes too low, nerves become hyperexcitable, and spontaneous firing can occur, resulting in muscle spasms. Study and control of any of these biological functions requires strict control of the concentration of $Ca^{2+}$.

There is also a need for the accurate removal and/or control of other ions. $Mg^{2+}$ is required for activity of ribulose diphosphate carboxylase and phosphoenolpyruvate carboxylase, the two major carbon dioxide fixing enzymes in plants, and is essential for activity of chlorophyll. In plants, $K^+$ activates pyruvate kinase (a glycolysis enzyme), starch synthetase, and is involved in protein synthesis. $K^+$ also appears to be the main cation used to balance charges during transport of anions through the plant. It also appears that $K^+$ and $Mg^{2+}$ are required for activity of plasma membrane H⁺-ATPase, an enzyme essential for ion transport in plant cells exposed to saline environments. As such, appropriate compositions may be selected by those skilled in the art to carry out the removal of these and other ion species from biological solutions for the study of the biological function of these ions on the biological fluid or system.

If solid supports are to be the substrate used in the present method, the solid supports may be a porous or non-porous inorganic or organic solid support. More specifically, sand, silica, silica gel, silicates, zirconia, titania, alumina, nickel oxide, glass (e.g., fibers and beads), phenolic resins, polystyrenes, polyacrylates and combinations thereof are preferred solid supports. However, other organic resins or any other hydrophilic organic and/or inorganic support materials meeting the above criteria can also be used.

In a preferred embodiment, with respect to the use of inorganic solid supports for the substrate material, the spacer grouping is generally attached to the solid support such that the covalent linkage mechanism may be link the solid support to the ligand. In another preferred embodiment, with respect to organic solid supports, the solid support may be directly linked to the ligand. These preferred mechanisms and others are described more fully in U.S. Pat. Nos. 4,943,375, 4,952,321, 4,959,153, 4,960,882, 5,039,419, 5,071,819, 5,078,978, 5,084,430, 5,173,470, 5,179,213, 5,182,251, 5,190,661, 5,244,856, 5,273,660 and 5,393,892, each of which are incorporated herein by reference.

To illustrate a few preferred embodiments, the methods of the present invention may be carried out where S is a membrane containing a hydrophilic surface and polar functional groups, L contains a functional grouping reactive with an activated polar group from S, and B is the covalent linkage formed between the activated polar group of S and the functional grouping of L. In an alternative preferred embodiment, S is a porous or nonporous inorganic solid support having a hydrophilic spacer grouping attached thereto, L contains a functional grouping reactive with the hydrophilic spacer grouping, and B is a covalent linkage mechanism formed between the hydrophilic spacer grouping attached to S and the functional grouping of L. In a third preferred embodiment, S is a porous or nonporous organic solid support containing a hydrophilic surface and polar functional groups, L contains a functional grouping reactive with an activated polar group from S, and B is the covalent linkage formed between the activated polar group of S and the functional grouping of L.

Turning to the use of membranes as the substrate of attachment, membranes that are inherently hydrophilic or partially hydrophilic, and contain moieties appropriate for making these bonds are preferred. Such membranes include polyamides such as nylon, and cellulosic materials such as cellulose, regenerated cellulose, cellulose acetate and nitrocellulose. If the membrane used does not contain reactive groups it may be modified or derivatized appropriately.

Composite membranes are also preferred. A composite membrane comprises a porous polymer or copolymer membrane core and an insoluble coating deposited thereon. The substrate and the coating may be joined by crosslinking, grafting or by other known procedures. Representative suitable polymers forming the membrane core substrate include fluorinated polymers including poly (tetrafluoroethylene) ("TEFLON"), polyvinylidene fluoride (PVDF), and the like; polyolefins such as polyethylene, ultrahigh molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; polyethers such as perfluorinated polyethers; and vinyl polymers such as polyvinyl chloride and polyacrylonitriles. Copolymers can also be used for forming the polymer membrane, such as copolymers of butadiene and styrene, fluorinated ethylene-propylene copolymer, ethylene-chlorotrifluoroethylene copolymer, and the like. The preferred membrane is a hydrophilic ultrahigh molecular weight polyethylene (UPE) containing carboxylic groups, such as those described in U.S. Pat. Nos. 4,618,533, 5,618,433 and 5,547,760.

The membrane is selected to yield both selected bulk properties and selected surface properties. For naturally hydrophilic membranes, the selected bulk and surface properties will be provided by the polymer of which the membrane is formed. For composite membranes, the selected bulk properties will be provided by the membrane substrate and the selected surface properties will be provided by the coating.

A composite membrane is formed by depositing a monomer directly on the surface of the substrate, including the inner surfaces of the pores, by in situ deposition of the cross-linked monomer. The desired deposition of the cross-linked monomer onto the porous substrate is effected as a direct coating and does not require or utilize an intermediate binding chemical moiety. Any monomer for the coating polymer can be used so long as it is capable of being polymerized by free radical polymerization and can be crosslinked. The only requirements of the polymerized monomer is that it is capable of coating the entire surface of the porous membrane, that it provide the surface with ligand-reactive functional groups and that it be sufficiently hydrophilic to allow for efficient use of the ligand to be attached. Generally, the porous substrate has an average pore size between about 0.001 and 10 $\mu$m, and more usually, between about 0.1 and 5.0 $\mu$m. The composite membrane is formed by any suitable method, such as is disclosed in U.S. Pat. No. 4,618,533, which is hereby incorporated by reference in their entirety. Briefly, this procedure involves washing the porous membrane substrate with a suitable solvent for wetting the entire surface of the substrate. The substrate is then bathed in a mixture of the free radical polymerizable monomer, a polymerization initiator, and a cross-linking agent in a solvent under conditions to effect free radical polymerization of the monomer and coating of the porous substrate with the cross-linked polymer. The surface of the coated polymer membrane contains hydrophilic or polar-substituents that can be activated to react with and covalently bond the ligands to the membrane surface.

The composite membranes prepared according to U.S. Pat. No. 4,618,533 can contain carboxylic acid moieties on the surface. Other suitable moieties could include hydroxyl, sulfonic acid, epoxy, primary amine and derivatized benzyl groups such as polymers referenced above.

Preparation of a composite membrane by a precipitated crystal technique involves, briefly, washing the porous membrane substrate with a suitable solvent for wetting the entire surface of the substrate. The substrate is then bathed in a solution containing the compound which is to be precipitated. This solution is then removed and the membrane substrate is treated with a compound that precipitates and fixes the crystals to the substrate. The membrane is washed and dried before use.

With composite membranes, the core membrane material is not thought to affect that performance of the derivatized membrane and it is limited in composition only by its ability to be coated, or have deposited on its surface, an insoluble polymer layer that contains the appropriate reactive group. This provides a hydrophilic layer which interacts well with water or other aqueous solutions. The end result is that when the ligand is attached to the surface of either a hydrophilic membrane or a composite membrane having a hydrophilic surface, the basic characteristics of any given ligand molecule are not changed by the process of attaching it to the surface or by the nature of the surface itself.

The coating of a composite membrane comprises a polymerized cross-linked monomer. Representative suitable polymerizable monomers include hydroxyalkyl acrylates or methacrylates including 1-hydroxyprop-2-yl acrylate and 2-hydroxyprop-1-yl acrylate, hydroxypropylmethacrylate, 2,3-dihydroxypropyl acrylate, hydroxyethylacrylate, hydroxyethyl methacrylate, and the like, and mixtures thereof. Other polymerizable monomers that can be utilized include acrylic acid, 2-N,N-dimethylaminoethyl methacrylate, sulfoethylmethacrylate and the like, acrylamides, methacrylamides, ethacrylamides, and the like. Other types of hydrophilic coatings that can be used within the scope of the invention include expoy functional groups such as glycidyl acrylate and methacrylate, primary amines such as aminoethyl methacrylates and benzyl derivatives such as vinyl benzyl chloride, vinyl benzyl amine and p-hydroxyvinyl benzene.

The basic consideration in selecting a composite membrane is that the coating placed on the membrane substrate is the determining factor in defining the chemistry used to covalently attach the ion binding ligand. For example, a composite membrane displaying a carboxylic acid functional group can form an amide bond with a pendant amine group from the ligand, one of the most stable methods of ligand immobilization. The composite polymers referenced above can be prepared with carboxylic acid active groups that can be readily converted to amides upon reaction with an amine group on a ligand. However, any of the other organic species which are reactive toward an acid chloride could be used to attach an organic ligand to the surface. Additional examples of such groups would be esters, thioesters, Grignard reagents, and the like. If the reactive group on the surface is a sulfonic acid, then an analogous procedure using a sulfonyl chloride would yield results similar to those obtained with carboxylic acid functionalities. One such polymer containing sulfonic acid reactive groups is available under the tradename "NAFION" from DuPont as described above. Preferably, suitable ligands contain an ester or carboxyl group and an amide to form an amide linkage.

In one embodiment, the coating of composite membranes also comprises a precipitated crystal system, such as that involving the material known under the trademark NAFION®. NAFION® is a sulfonic acid or sodium sulfonate of a perfluorinated polyether. In another embodiment, the preferred coating is commercially available as ETCHGUARD™ (Millipore Corporation); U.S. Pat. No. 4,618,533.

For example, immobilization of the ligand onto the membrane is carried out in a two step procedure: [1] activation and [2] coupling. The activation procedure involves reaction of carboxylic acid groups on membranes with 1-Ethyl-3-(3-Dimethylaminopropyl) carbodiimide hydrochloride (EDAC) in either water or IPA/water medium to produce a reactive intermediate compound. In the coupling step this reactive intermediate compound reacts with the amine group on the linker arm attached to the ligand, producing the ligand immobilized membrane surface. The immobilization procedure can be carried out for multiple ligands that are immobilized one at a time (in series), or for multiple ligands co-immobilized simultaneously. In a preferred embodiment, the membrane is an ultrahigh molecular weight polyethylene having a hydrophilic coating, the ligand is covalently attached thereto via amide bonds. The hydrophilic coating is available under the trademark, ETCHGUARD™ (Millipore Corp., U.S. Pat. No. 4,618,533).

The membrane/ligand compositions that are useful for carrying out the present invention will be apparent to those skilled in the art, each of which utilizes a composite membrane prepared according to U.S. Pat. No. 4,618,533 and containing carboxylic acid groups or sulfonic acid groups. The membranes should have a microporous or ultraporous structure. Microporous pore sizes typically range from about 0.005 microns to about 10 microns. Ultraporous pore sizes are smaller than microporous pore sizes, typically ranging from about 0.0001 microns to about 0.005 microns. The ligands may be attached to the upstream outer surface of the membrane, the downstream outer surface of the membrane, the inner porous surface of the membrane or any combination of these surfaces. Preferably, the entire surface of the membrane, including the pores, contain ligands.

The invention will now be illustrated by the following examples which are not intended to be limiting in any way. All references cited herein are incorporated herein in their entirety.

EXAMPLES

The following examples illustrate the preferred embodiments of the invention that are presently best known. However, other embodiments may be made within the scope of the disclosure. In certain of the examples, reaction schemes are given that are general in nature and reference to the text of each example may be necessary to clarify each reactant, reaction step, reaction condition and product obtained.

Example 1

Preparation of a Column Packed with Ligand-Bound Beads

Acrylate beads of 0.5 mm diameter and having $Ca^{2+}$ specific ligands bound thereto, such as those described in the above referenced copending application (09/838,663), were cleaned by first soaking with isopropyl alcohol, then distilled deionized water, and then 6M hydrochloric acid. The beads were then equilibrated with 50 mM Tris-HCl at pH 7.0. Cleaning in this way was found to increase the ion-binding capacity of the beads. Two milliliters of the beads were then placed in a suitable column, such as a BioRad[7] PolyPrep column (0.8 cm×4 cm). The column was packed by passing water through it at 50 psi for 5 minutes. This method results in a tight and consistent packing of the beads in the column.

Example 2

Preparation of a Column Packed with Ligand-Bound Beads

A similar process was followed as in Example 1 with the exception that the ligand was specific for both $Ca^{2+}$ and $Mg^{2+}$. Functional ligands exhibiting these properties include alkylene polyamine acid containing ligands such as those available from IBC Advanced Technologies, Inc., under the tradename SUPERLIG 430.

Example 3

Removal of $Ca^{2+}$ and $Mg^+$ Ions from Tris-HCl Buffer

Tris-HCl buffer (50 mM, pH 7.0) was spiked with 1.8 mM $CaCl_2$ and 0.83 mM $MgCl_2$. The spiked buffer was passed through a column packed with the ligand-bound acrylate beads described in Example 2 at a flow rate of 1 ml/minute. The filtrate was collected in 1 ml fractions and $Ca^{2+}$ and $Mg^{2+}$ ion concentrations were measured by a Varian GFA100-Spectra AA800 Graphite Furnace Atomic Absorption (Varian, Palo Alto, Calif., USA). The results are shown in FIG. 1, which is a graph showing the removal of $Ca^{2+}$ and $Mg^{2+}$ ions from the Tris-HCl buffer. The column packed with 2 grams of cleaned, ligand-bound beads completely removed both the $Ca^{2+}$ and $Mg^{2+}$ ions from approximately 50 ml of the spiked Tris-HCl buffer. The 1 ml fractions after 50 ml began to display saturation, and retention of $Ca^{2+}$ and $Mg^{2+}$ ions by the beads correspondingly declined.

Example 4

Removal of $Ca^{2+}$ Ions from Tris-HCl Buffer 0.2 grams of ligand-bound acrylate beads specific for $Ca^{2+}$ ions were cleaned and equilibrated using the methods described above in Example 1. They were then soaked in 1 ml of Tris-HCl buffer (pH 7.0) spiked with $CaCl_2$ and $MgCl_2$. The beads were allowed to soak overnight in the spiked buffer so as to remove the maximum amount of $Ca^{2+}$ ions possible. The beads settled overnight, and the next morning the concentration of $Ca^{2+}$ and $Mg^{2+}$ ions in the supernatant were measured. Before addition of the beads, the concentration of $Ca^{2+}$ and $Mg^{2+}$ ions were 1.25 mM and 0.65 mM, respectively. After the overnight soak, the concentrations were 0.02 mM and 0.65 mM, respectively. As predicted, this ligand is calcium-specific, and has little effect on the concentration of $Mg^{2+}$ ions in solution.

Example 5

Removal of $Ca^{2+}$ Ions to Trigger Release of L-DOPA by Mucona Pruriens Cells

Cells of Mucona pruriens have been found to endogenously synthesize L-DOPA (3-(3,4-dihydroxy-L-phenyl) alanine), a catecholaminergic amino acid. When grown in suspension cultures, 90–95% of the L-DOPA is accumulated intracellularly. When the cells are immobilized in alginate, however, up to 90% of the L-DOPA is excreted into the medium. Because L-DOPA may represent up to 9% of the cells' dry weight, immobilized cultures of these plant calls provide an excellent production system for this compound.

Suspension cultures of Mucona pruriens cells are prepared from leaf callus and immobilized in calcium alginate, as described in Wichers et al. (Planta 158:482–486, 1983). The cells are grown in MS medium (Murashige and Skoog, Physiologia Plantarum 15:473–497, 1962) supplemented with 1 mg/l indole-3-acetic acid (IAA), 1 mg/l $N^6$-benzyladenine (BA), and 4% (w/v) sucrose at pH 5.9 (before autoclaving). The cultures are transferred each week at a rate of 100 ml of culture into 200 ml fresh medium in a 500 ml Erlenmeyer flask.

To immobilize the cultures, the cells are filtered through a 400 µm mesh, and centrifuged at 1500 g for 5 minutes. The cells are then resuspended in fresh medium at a final density of 66 g per 100 ml. This suspension is then mixed with an equal volume of sterile (autoclaved) sodium alginate (5% w/v) in MS medium. The mixture is extruded slowly from a needle as compressed air is blown onto it, and the droplets are collected in MS medium containing 2% (w/v) $CaCl_2$ $2H_2O$. The resulting beads are stirred overnight at room temperature in the calcium chloride solution to harden them. The beads are then washed twice for 10 minutes with MS incubation medium, and transferred to Erlenmeyer flasks containing 100 ml of fresh medium supplemented with 2 mM L-tyrosine. The flasks are shaken at 120 rpm under constant illumination of 1500 1x.

M. pruriens cells produce L-DOPA from L-tyrosine, but production of L-DOPA decreases with increasing concentration of free calcium in the medium (Wichers, et al., Planta 158:482–486, 1983). In order to maximize L-DOPA production, it is necessary to remove the free calcium ions in the medium. Therefore, after the alginate beads are formed and hardened overnight in the calcium chloride-supplemented MS medium, they are moved to fresh medium containing no calcium. As $Ca^{2+}$ leaches from the beads, it is removed by circulating the medium through a column containing the ligand-bound beads of Example 1. The ligand-bound beads will be saturated with $Ca^{2+}$ ions more quickly at first as the calcium leaches out of the beads, but can be expected to drop off as the beads equilibrate. The precise rate at which the ligand-bound beads become saturated and need to be replenished will vary depending on the size of the alginate beads, but can be determined by one of ordinary skill.

Removing the $Ca^{2+}$ ions from the medium in this way can maximize the amount of L-DOPA released from the cells and also reduce the frequency at which the culture medium needs to be replaced.

Example 6

Control of $Mg^{2+}$ Ion Concentration in Thermocycling Buffer

The enzymes used in oligonucleotide primer-directed amplification of nucleotide sequences are very sensitive to divalent cations. The concentration of $Mg^{2+}$ in particular can have a large effect on the outcome of the amplification in terms of specificity and yield. In general, too little $Mg^{2+}$ will result in poor product yields, while too much will result in non-specific amplification. Conditions often must be optimized for a particular use, but concentrations of about 1.0–1.5 mM are usually optimal (Ehrlich, H. A., ed., PCR Technology, Principles and Applications for DNA Amplification, Stockton Press, New York, USA, 1989).

The amplification buffer can be stripped of its native $Mg^{2+}$ ion concentration by being passed through a column packed with the ligand-bound beads as described in Example 2. The amount of $Mg^{2+}$ appropriate for the amplification reaction can then be added back into the buffer, thereby ensuring that the ion concentration in the buffer is accurately known.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for studying the effects of one or more metal ion species on one or more biological functions, comprising:
   (a) contacting a biological solution containing one or more metal ion species and wherein one or more biological functions may occur with a composition represented by the formula:

wherein S is a substrate, L is any ion-binding ligand having an affinity for said one or more metal ion species and a functional group for attachment to S, and B is a covalent linkage mechanism which attaches S to L, such that a complex between said one or more metal ion species and L is formed;
(b) removing said biological solution from contact with said composition to which said one or more metal ion species has been complexed whereby the concentration of said one or more metal ion species has been reduced in said biological solution; and
(c) testing for the occurrence of the biological function in said biological solution relative to the occurrence of the biological function in a control biological solution not contacted with the composition of (a), whereby the effects of the one or more metal ion species on the one or more biological functions becomes known.

2. A method as in claim 1 wherein said one or more metal ion species are selected from the group consisting of $Ca^{2+}$, $Mg^{2+}$, $Na^+$, $K^+$, $Fe^{2+}$, $Fe^{3+}$, $Cr^{3+}$ and combinations thereof.

3. A method as in claim 1 wherein the biological solution is a physiological buffer.

4. A method as in claim 1 wherein the biological solution is tissue culture medium.

5. A method as in claim 4 wherein the tissue culture medium is later solidified.

6. A method as in claim 1 wherein the biological solution is nucleic acid amplification buffer.

7. A method as in claim 1 wherein S is selected from the group consisting of hydrophilic membranes, partially hydrophilic membranes, composite membranes, porous organic solid supports, nonporous organic solid supports, porous inorganic solid supports, nonporous inorganic solid supports, and combinations thereof.

8. A method as in claim 7 wherein S is a membrane containing a hydrophilic surface and polar functional groups, L contains a functional grouping reactive with an activated polar group from S, and B is the covalent linkage formed between the activated polar group of S and the functional grouping of L.

9. A method as in claim 8 wherein the membrane is a hydrophilic membrane selected from the group consisting of cellulose, regenerated cellulose, cellulose acetate, and nitrocellulose.

10. A method as in claim 8 wherein the membrane is a composite membrane comprised of a cross-linked coating and a polymer or copolymer core.

11. A method as in claim 7 wherein S is a porous or nonporous inorganic solid support having a hydrophilic spacer grouping attached thereto, L contains a functional grouping reactive with the hydrophilic spacer grouping, and B is a covalent linkage mechanism formed between the hydrophilic spacer grouping attached to S and the functional grouping of L.

12. A method as in claim 11 wherein S is a porous or nonporous inorganic solid support selected from the group consisting of sand, silicas, silicates, silica gel, glass, glass beads, glass fibers, alumina, zirconia, titania, nickel oxide, and combinations thereof.

13. A method as in claim 7 wherein S is a porous or nonporous organic solid support containing a hydrophilic surface and polar functional groups, L contains a functional grouping reactive with an activated polar group from S, and B is the covalent linkage formed between the activated polar group of S and the functional grouping of L.

14. A method as in claim 13 wherein S is a porous or nonporous organic solid support selected from the group consisting of polyacrylate, polystyrene, polyphenol and combinations thereof.

15. A method as in claim 7 wherein said composite membrane is comprised of a coating and a polymer or copolymer substrate, said substrate selected from the group consisting of poly(tetrafluoroethylene), polyvinylidene fluoride, polyethylene, ultra-high molecular weight polyethylene, polypropylene, polymethylpentene, polystyrene, substituted polystyrenes; polysulfone, polyethersulfone, polyethylene terephthalate, polybutylene terephthalate, polyacrylates, polycarbonates, polyethers; polyvinyl chloride, polyacrylonitriles, copolymers of butadiene and styrene, fluorinated ethylene-propylene copolymer, and ethylene-chlorotrifluoroethylene copolymer.

16. A method as in claim 1 wherein said one or more metal ion species is $Ca^{2+}$ and wherein any $Mg^{2+}$ substantially remains in the biological solution after removal said composition.

17. A method for making a biological solution containing a known concentration of one or more metal ion species, comprising:
(a) contacting a biological solution containing one or more metal ion species and wherein one or more biological functions may occur with a composition represented by the formula:

$$S—B—L$$

wherein S is a substrate, L is any ion-binding ligand having an affinity for said one or more metal ion species and having a functional group for attachment to S, and B is a covalent linkage mechanism which attaches S to L, such that a complex between said one or more metal ion species and L is formed;
(b) removing the biological solution from contact with the composition, whereby the concentration of said one or more metal ion species in the solution is reduced;
(c) repeating steps (a) and (b) until the biological solution is essentially free of said one or more metal ion species;
(d) adding to the biological solution a known quantity of said one or more metal ion species;

thereby making a biological solution containing a known concentration of said one or more metal ion species.

18. A method as in claim 17 wherein said one or more metal ion species are selected from the group consisting of $Ca^{2+}$, $Mg^{2+}$, $Na^+$, $K^+$, $Fe^{2+}$, $Fe^{3+}$, $Cr^{3+}$ and combinations thereof.

19. A method as in claim 17 wherein the biological solution is a physiological buffer, tissue culture medium or nucleic acid amplification buffer.

20. A method as in claim 17 wherein S is selected from the group consisting of hydrophilic membranes, partially hydrophilic membranes, composite membranes, porous organic solid supports, nonporous organic solid supports, porous inorganic solid supports, nonporous inorganic solid supports, and combinations thereof.

21. A method as in claim 20 wherein S is a membrane containing a hydrophilic surface and polar functional groups, L contains a functional grouping reactive with an activated polar group from S, and B is the covalent linkage formed between the activated polar group of S and the functional grouping of L.

22. A method as in claim 20 wherein S is a porous or nonporous inorganic solid support having a hydrophilic spacer grouping attached thereto, L contains a functional grouping reactive with the hydrophilic spacer grouping, and B is a covalent linkage mechanism formed between the hydrophilic spacer grouping attached to S and the functional grouping of L.

23. A method as in claim 20 wherein S is a porous or nonporous organic solid support containing a hydrophilic surface and polar functional groups, L contains a functional grouping reactive with an activated polar group from S, and B is the covalent linkage formed between the activated polar group of S and the functional grouping of L.

24. A method as in claim 20 wherein the hydrophilic membrane selected from the group consisting of polyamide, cellulose, regenerated cellulose, cellulose acetate, and nitrocellulose.

25. A method as in claim 20 wherein the composite membrane is comprised of a cross-linked coating and a polymer or copolymer core.

26. A method as in claim 20 wherein the porous or nonporous inorganic solid support is selected from the group consisting of sand, silica gel, glass, glass fibers, alumina, zirconia, titania, nickel oxide and combinations thereof.

27. A method as in claim 20 wherein the porous or nonporous organic solid support selected from the group consisting of polyacrylate, polystyrene, polyphenol and combinations thereof.

28. A method as in claim 20 wherein said composite membrane is comprised of a coating and a polymer or copolymer substrate, said substrate selected from the group consisting of poly(tetrafluoroethylene), polyvinylidene fluoride, polyethylene, ultra-high molecular weight polyethylene, polypropylene, polymethylpentene, polystyrene, substituted polystyrenes; polysulfone, polyethersulfone, polyethylene terephthalate, polybutylene terephthalate, polyacrylates, polycarbonates, polyethers; polyvinyl chloride, polyacrylonitriles, copolymers of butadiene and styrene, fluorinated ethylene-propylene copolymer, and ethylene-chlorotrifluoroethylene copolymer.

29. A method as in claim 18 wherein said one or more metal ion species is $Ca^{2+}$ and wherein any $Mg^{2+}$ substantially remains in the biological solution after removal said composition.

30. A method for preferentially removing calcium ion species from a protein-containing biological solution comprising:

(a) contacting a biological solution containing a protein and a calcium ion species with a composition represented by the formula:

wherein S is a substrate, L is any ion-binding ligand having an affinity for said calcium ion species and having a functional group for attachment to S, and B is a covalent linkage mechanism which attaches S to L, such that a complex between said calcium ion species and L is formed; and (b) removing the biological solution from contact with the composition, whereby the concentration of said calcium ion species in the solution is reduced.

31. A method as in claim 30 wherein said calcium ion species are recovered by the further steps of contacting said composition having said calcium ion species complexed thereto with a smaller volume of an aqueous receiving solution in which said calcium ion species are soluble, or which has greater affinity for such calcium ion species than does the ligand portion of the composition, or which has a greater affinity for said ligand than does the calcium ion species, thereby quantitatively stripping such calcium ion species from the ligand.

* * * * *